(12) United States Patent
Kuennen

(10) Patent No.: US 11,498,851 B2
(45) Date of Patent: Nov. 15, 2022

(54) FLUID FILTERING SYSTEM AND ASSOCIATED METHODS

(71) Applicant: Roy Kuennen, Port Orange, FL (US)

(72) Inventor: Roy Kuennen, Port Orange, FL (US)

( * ) Notice: Subject to any disclaimer, the term of this patent is extended or adjusted under 35 U.S.C. 154(b) by 0 days.

(21) Appl. No.: 17/837,288

(22) Filed: Jun. 10, 2022

(65) Prior Publication Data
US 2022/0306487 A1 Sep. 29, 2022

(51) Int. Cl.
| | |
|---|---|
| *C02F 1/00* | (2006.01) |
| *C02F 1/76* | (2006.01) |
| *B01D 29/15* | (2006.01) |
| *B01D 35/26* | (2006.01) |
| *B01D 35/28* | (2006.01) |
| *B01D 35/30* | (2006.01) |
| *B01D 15/12* | (2006.01) |
| *B01D 15/14* | (2006.01) |
| *B01D 15/18* | (2006.01) |
| *B01D 15/10* | (2006.01) |
| *C02F 1/28* | (2006.01) |

(52) U.S. Cl.
CPC .............. *C02F 1/002* (2013.01); *B01D 15/10* (2013.01); *B01D 15/125* (2013.01); *B01D 15/14* (2013.01); *B01D 15/1885* (2013.01); *B01D 29/15* (2013.01); *B01D 35/26* (2013.01); *B01D 35/28* (2013.01); *B01D 35/303* (2013.01); *B01D 35/306* (2013.01); *C02F 1/283* (2013.01); *C02F 1/76* (2013.01); *B01D 2201/0415* (2013.01); *B01D 2201/06* (2013.01); *B01D 2201/282* (2013.01); *B01D 2201/301* (2013.01); *B01D 2201/309* (2013.01); *B01D 2201/40* (2013.01); *C02F 2201/004* (2013.01); *C02F 2201/005* (2013.01); *C02F 2201/006* (2013.01); *C02F 2201/007* (2013.01); *C02F 2303/04* (2013.01)

(58) Field of Classification Search
CPC ....... C02F 1/002; C02F 2307/10; C02F 9/005
See application file for complete search history.

(56) References Cited

U.S. PATENT DOCUMENTS

| | | | | |
|---|---|---|---|---|
| 6,013,180 A | * | 1/2000 | Wang | ............... C02F 1/003 |
| | | | | 210/255 |
| 2016/0340217 A1* | | 11/2016 | Kuennen | ............... C02F 1/76 |

* cited by examiner

*Primary Examiner* — Benjamin M Kurtz
(74) *Attorney, Agent, or Firm* — Bullock Law; Stephen Bullock

(57) ABSTRACT

A two-stage filtering system including a first and second filter container. The first filter container has a first filter assembly with a foam filter sleeve enveloping a fluid intake device, a connected valve, and transfer tubing. The second filter includes a pump connected to a spout, a second stage splashguard strainer, a second stage cup filter, and a second filter assembly. The second filter assembly includes at least one main filter comprising at least one carbon body filter enveloping a filter chamber, and exit tubing. The first filter container is structured to stack on top of the second filter container and the transfer tubing is structured to transfer first stage filtered fluid to the second filter container. The pump is structured to draw second stage filtered fluid from the second container through the exit tubing and expel the second stage filtered fluid out the spout to provide purified water.

20 Claims, 14 Drawing Sheets

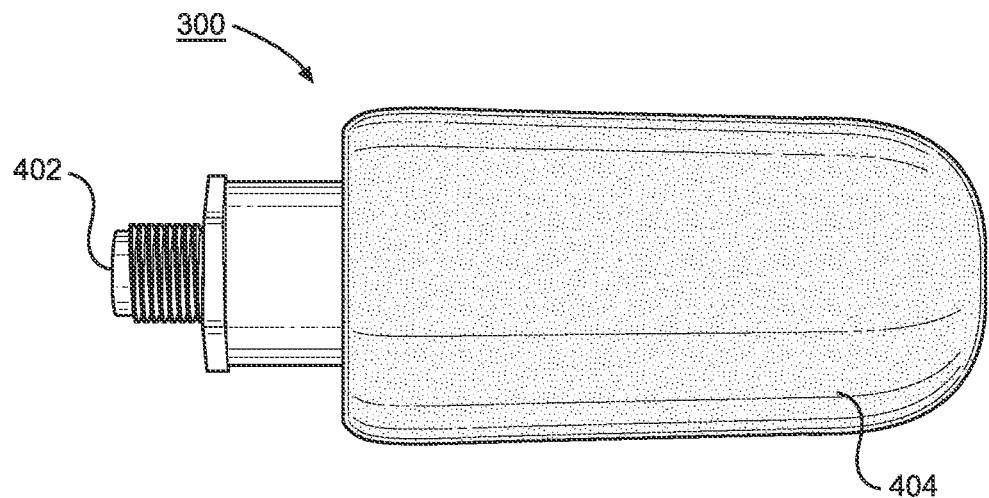
FIG. 4A
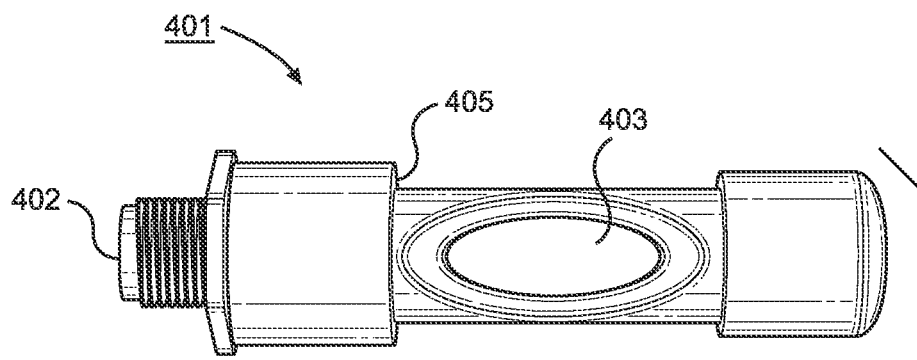
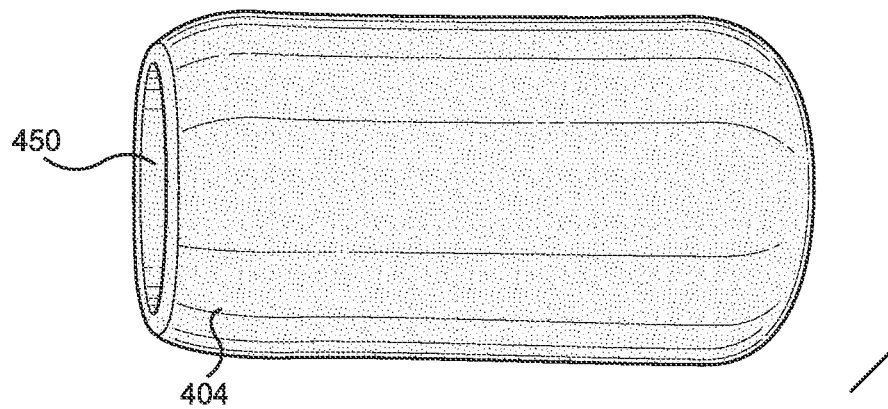
FIG. 4B

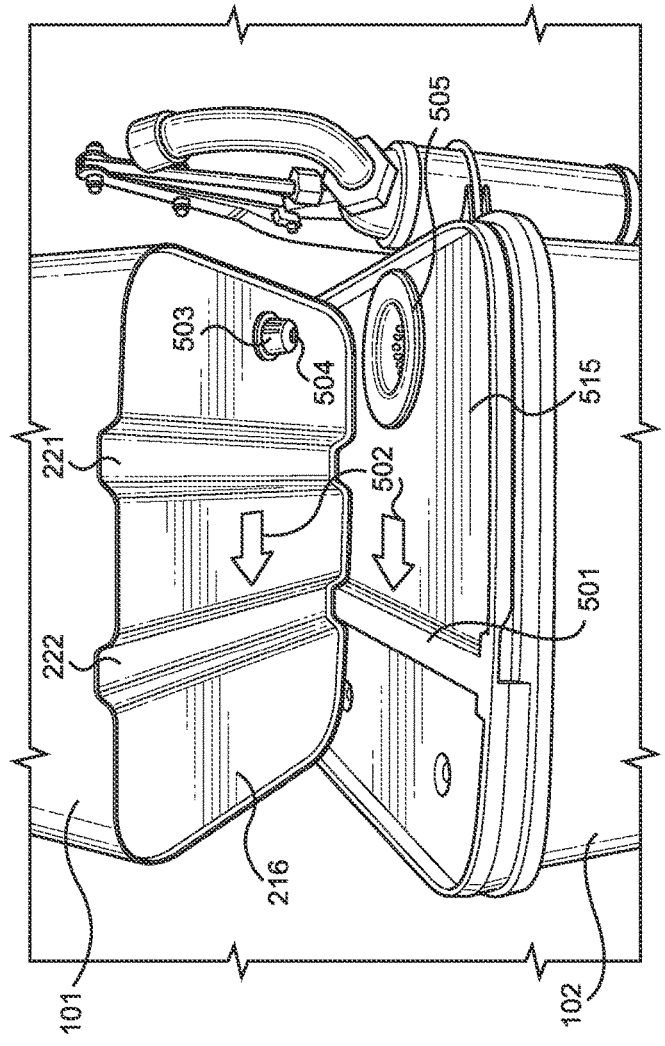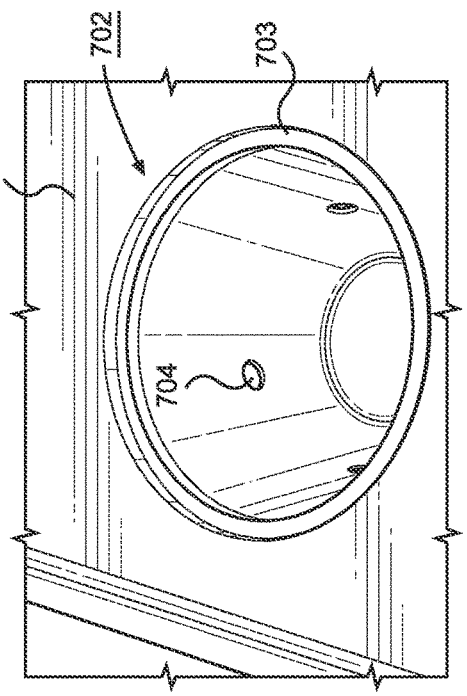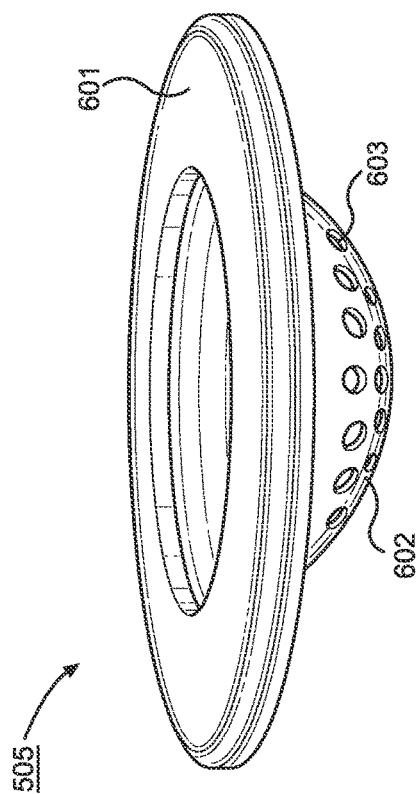

FLUID FILTERING SYSTEM AND ASSOCIATED METHODS

FIELD OF THE INVENTION

The present invention relates to systems and methods for purifying fluids, namely water. In particular, the present invention relates to a nonelectric fluid filtering system and associated methods.

BACKGROUND

The lack of clean water is a problem that impacts civilizations worldwide, but disproportionally affects developing countries. Contributing factors include poor infrastructure and mismanagement of services, poverty, climate change, and population growth.

By some measures, more than 80% of sewage in developing countries is discharged into the community untreated thereby polluting surrounding rivers, lakes and coastal areas. Furthermore, long periods of drought can affect clean water supplies, while flooding and other natural disasters can also pollute clean water sources and cause outbreaks of disease. Additionally, the world's population is predicted to grow to 8.5 billion people by the year 2030 and to 9.7 billion people by 2050. This level of population growth is placing an increased demand on already scarce resources. Hence, the lack of clean water is a progressively more persistent problem.

There exists a need to treat water in developing countries and poor segments of other populations in an efficient manner. The water treatment should produce a high purification percentage while being cost effective, nonelectric, portable and easy to use. Therefore, there exists a need in the art for a fluid filtering system and associated methods as described herein.

This background information is provided to reveal information believed by the applicant to be of possible relevance to the present invention. No admission is made as to prior art and nothing within the background should be construed as prior art against the present invention.

SUMMARY OF THE INVENTION

Embodiments of the present invention are related to a two-stage filtering system including a first filter container and a second filter container. The first filter container may include a top, a bottom, a pump side and a non-pump side, a first filter assembly including a foam filter sleeve enveloping a fluid intake device, a valve connected to the first filter assembly, and transfer tubing. The second filter container may include a top with cupholder aperture, a bottom, a pump side and a non-pump side, a pump connected to a pump spout, a second stage splashguard strainer, a second stage cup filter, a second filter assembly with at least one main filter including at least one carbon body filter enveloping a filter chamber, and exit tubing. The first filter container is structured to stack on top of the second filter container and the transfer tubing is structured to transfer first stage filtered fluid to the second filter container. The pump is operable to draw second stage filtered fluid from the second container through the exit tubing and expel the second stage filtered fluid out the pump spout.

In this embodiment, the pump may be nonelectric and the first filter container may be structured to purify fluid using a nonelectric passive first filter assembly. The second filter container may be structured to draw the purified fluid through the at least one main filter via the nonelectric pump.

This embodiment may further include a lever with valve cover structured to convert the valve into a user-friendly handle operable to turn passive filtering on and off within the first filter container. Additionally, the second stage cup filter may include drainage holes spaced at measured distances operable to allow for timed filtering and the integration of a fluid purifying compound into passing fluid.

Furthermore, the at least one main filter may include a cylindrical carbon filter body with a first endcap and a second endcap. The first endcap may include a filter spout and spout opening structured to fit inside the exit tubing and may be operable to draw fluid through the second filter assembly and out a first end. The exit tubing may be structured to descend into a lower portion of the second filter container and may be operable to secure the at least one main filter within a lower quadrant of the second filter container.

In this embodiment, the second stage cup filter may be structured to fit within the cupholder aperture in the second container top and the second stage splashguard strainer may be structured to fit overtop the second stage cup filter. The transfer tubing may extend from an interior of the first filter container to a nodule extending from the first filter container bottom. The nodule may be structured to fit within a concave portion of the second stage splashguard strainer. Furthermore, the nodule may include a transfer opening sized and structured to allow fluid to exit the first filter container at a specifically timed pace.

Another embodiment may encompass a two-stage filtering system with a first filter container and a second filter container. The first filter container may include a top, a bottom, a pump side and a non-pump side, a first filter assembly with a first cylindrical foam filter body with interior chamber enveloping a fluid intake device, a lever assembly including an extended lever and a valve connected to the first filter assembly, and transfer tubing extending through the first filter container bottom and terminating in a transfer tube nodule on the first filter container bottom exterior.

The second filter container may have a top, a bottom, a pump side and a non-pump side, a pump connected to a pump spout, a second stage splashguard strainer, a second stage cup filter, a second filter assembly with at least one main filter including at least one cylindrical carbon body filter enveloping a fluid chamber positioned between a first endcap and a second endcap, and exit tubing. The first filter container may be structured to stack on top of the second filter container and the lever assembly may be structured to turn passive filtration on and off within the first filter container. The transfer tubing may be structured to transfer first stage filtered fluid to the second filter container and the at least one main filter may be secured within the second filter container via exit tubing. The exit tubing may be connected to the first endcap at one end and the at least one main filter may be connected to a side stabilizer connected to the second end cap at an opposing end. The transfer tube nodule may include an opening sized and structured to provide time delivered purified fluid from the first filter container through the second stage splashguard strainer and into the second stage cup filter. Additionally, the pump may be structured to draw purified fluid from the second container through the exit tubing and expel the fluid out the pump spout.

In this embodiment, the first cylindrical foam filter and the at least one main filter may be positioned within a bottom quadrant of the first filter container and second filter container respectively. The lever assembly may removably engage a side mount fixedly attached to a wall of the first filter container. The first filter container may include a first track and a second track on its bottom structured to engage a stabilizing ridge on the second filter container top to orient the first filter container in a first position and a second position.

The first cylindrical foam filter may include a foam filter sleeve structured to be between 20-30% of the longitudinal length of the first filter container. The at least one main filter may be structured to be between 80-90% of the longitudinal length of the second filter container. Additionally, the system may further include at least one of container side handles, container pivoting lids, container stage indicators, a usage chart, a quick start guide, a filter replacement chart, and filter container water level ridges operable to assist with gauging appropriate water level within a respective filter container. Furthermore, at least one of the first filter container and the second filter container may include a viewing window structured to allow a user to see through a side of a respective container to view the level of water within the respective container.

Another embodiment may encompass a two-stage filtering system with a first filter container and a second filter container. The first filter container may include a top, a bottom, a pump side and a non-pump side, a first filter assembly including a cylindrical foam filter sleeve with interior chamber enveloping a fluid intake device, a lever assembly and a valve connected to the first filter assembly, and transfer tubing. The second filter container may include a top, a bottom, a pump side and a non-pump side, a pump connected to a pump spout, a second stage splashguard strainer, a second stage cup filter with drainage holes, a side viewing window, a second filter assembly including at least two main filters with cylindrical carbon body filters enveloping fluid chambers positioned between first endcaps and second endcaps, and exit tubing. The exit tubing may include an exterior elbow connected to the pump at the second container exterior, an upper exit tube on the second container interior that connects to the exterior elbow, an interior upper exit tube connected to a vertical exit tube, and an exit tube splitter structured to connect to dual lower exit tubing.

Each main filter may be secured at a first end within the second filter container via the lower exit tubing connected to each main filter first endcap. Each main filter may further be secured at a second end within the second filter container via side stabilizers connected to respective second endcaps of each main filter. The exit tubing may be structured to descend into a lower portion of the second filter container and may be operable to secure each main filter within a lower quadrant of the second filter container. The first filter container may be structured to stack on top of the second filter container and the lever assembly may be structured to turn passive filtration on and off within the first filter container. The transfer tubing may be structured to transfer first stage filtered fluid to the second filter container and the pump may be structured to draw purified fluid from the second filter container through the exit tubing and expel the fluid out the pump spout.

In this embodiment, the second filter container may include dual exterior filter stabilizers structured to connect with the interior side stabilizers to secure the at least two main filters. A stabilizer brace may be connected to the dual exterior filter stabilizers to maintain the structural integrity of the second filter container. The second stage cup filter may be structured to hold a purifying compound operable to facilitate fluid filtration and the drainage holes may be positioned to facilitate the purifying compound integration into passing fluid. Furthermore, the pump may include a reversible spout. Additionally, the second filter container may include an interior ridge structured to support the first filter container bottom perimeter facilitating compact packaging of the system.

BRIEF DESCRIPTION OF THE DRAWINGS

FIG. 4A is a top perspective view of a filter assembly within the first filter container according to an embodiment of the invention.

FIG. 4B is a top perspective view of a filter assembly within the first filter container according to an embodiment of the invention FIG. 5 is a bottom perspective view of the first filter container and a top perspective view of a second filter container according to an embodiment of the invention.

FIG. 6 is a side perspective view of componentry found on the second filter container according to an embodiment of the invention.

FIG. 7 is a top perspective view of componentry found on the second filter container according to an embodiment of the invention.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1A:
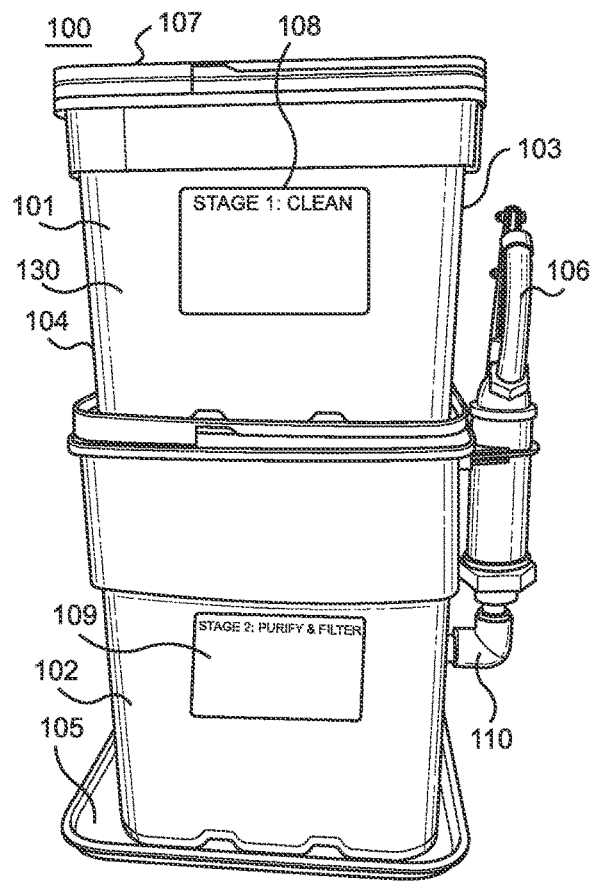
FIG. 1A is a front perspective view of a fluid filtering system according to an embodiment of the invention.
Figure 1B:
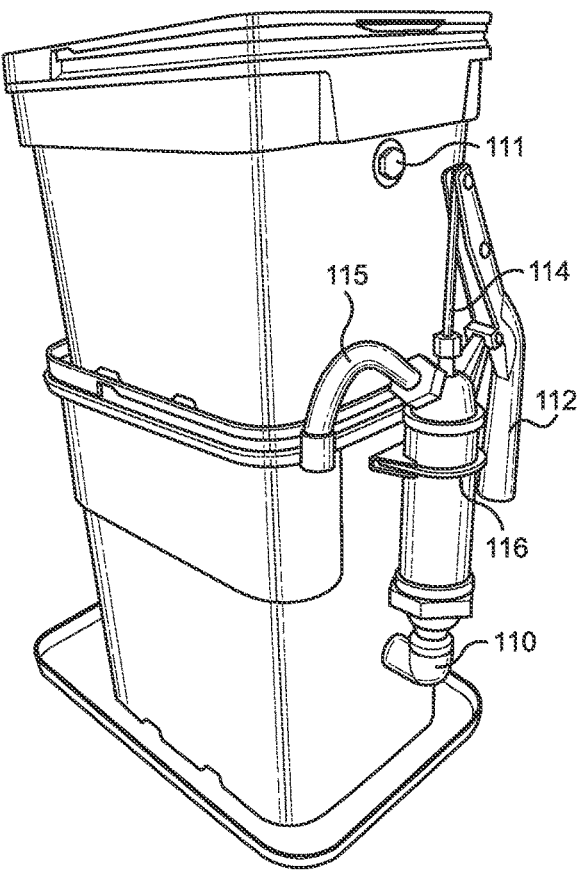
FIG. 1B is a side perspective view of a fluid filtering system according to an embodiment of the invention.

Referring now to FIGS. 1A and 1B, a front view and a perspective side view of a two-stage fluid filtering system 100, hereinafter system 100, is shown. The system 100 may include a first filter container 101 structured to sit or stack atop a second filter container 102. The first filter container 101 may include a top 107, a pump side 103, a non-pump side 104, and a front 130. The entire system 100 may sit atop a collection tray 105 structured to receive and collect condensation and other excess fluid that may flow from the system 100.

The front 130 may include a stage one indicator 108 designed to inform a user that the first filter container 101 is the first stage of the process and should be placed atop the second filter container 102. Likewise, the front 130 may include a stage two indicator 109 designed to inform a user that the second filter container 102 is the second stage of the process and should be placed underneath the first filter container 101. Additionally, a pump 106, and in some embodiments a nonelectric pump 106 may be attached to the pump side 103 of the second filter container 102 via an exterior elbow 110.

The pump 106 may include a pump handle 112 connected to pump hydraulics 114 that may facilitate a user manually pumping fluid out of the system 100 through the exterior elbow 110 and out a pump spout 115. A lever assembly brace 111 may extend from an exterior of the first filter container 101 through to a lever mount located therein to assist with stabilizing interior componentry. Likewise, the pump 106 may be further secured to the second filter container 102 via pump brace 116 on the second filter container 102 exterior.

Figure 2A:
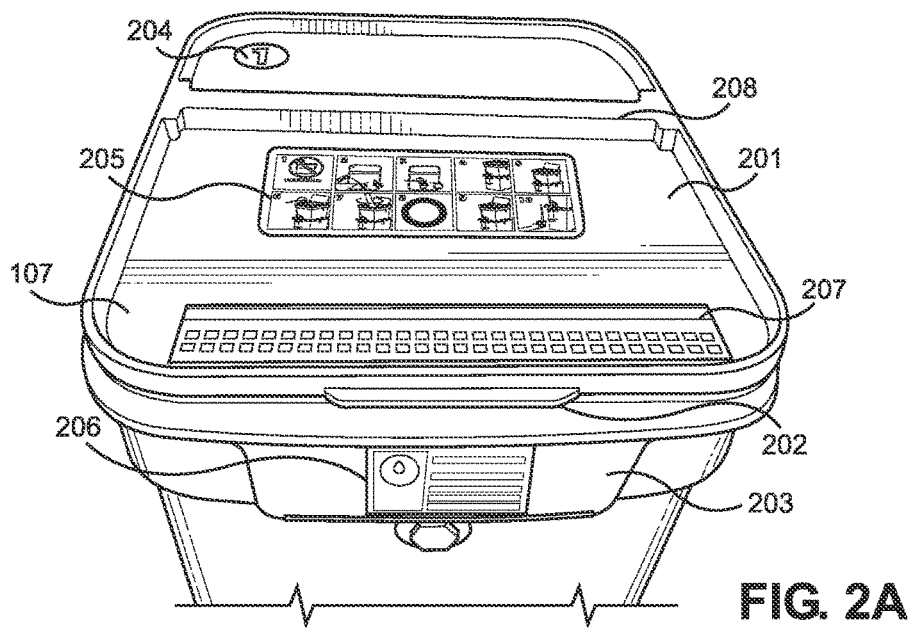
FIG. 2A is a top perspective view of a first filter container found within the fluid filtering system according to an embodiment of the invention.
Figure 2B:
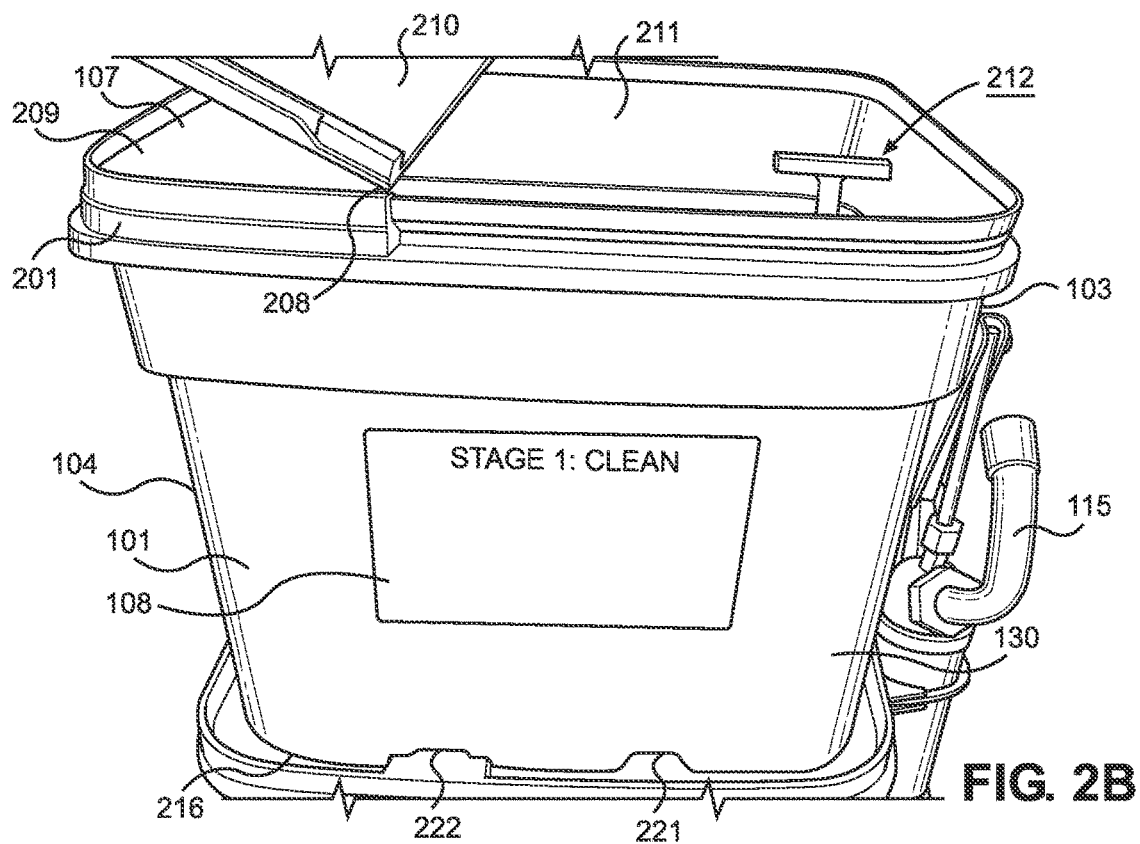
FIG. 2B is a front perspective view of the first filter container illustrated in FIG. 2A.

FIGS. 2A and 2B illustrate further features of the first filter container 101. In particular, the first filter container 101 may have its top 107 structured as a pivoting lid 201 with a pivot line 208 separating the pivoting lid 201 into two pivoting segments. The pivoting lid 201 may include at least one lid handle 202 structured to open a respective side of the lid proximate the lid handle 202. Additionally, the pivoting lid top 107 may include a quick start guide 205 structured to orient a user with the system 100 and provide a quick reference guide on how to use it. The pivoting lid top 107 may also include a usage chart 207 with finable segments structured to assist a user with maintaining an accurate accounting of use of the system 100. The first filter container 101 may further include a container handle 203 on opposing sides to assist with lifting. It may also include a filter replacement chart 206 to assist with maintaining an accurate accounting of interior filters.

FIG. 2B illustrates the first filter container 101 with an opened pivoting lid 201. As shown, the pivoting lid 201 may include a smaller section 209 and a larger section 210 and the larger section 210 is unattached and rotated along the pivot line 208 exposing an interior 211 of the first filter container 101. Also shown within the first filter container interior 211 is a lever assembly 212 and the spout 115 of the pump 106 in a reversed orientation. The spout 115 may be reversible so that it may provide a compact surface area facilitating its ability to be packaged along with the system 100 without having to be removed.

The first filter container bottom 216 may include a first track 221 and a second track 222 structured as archways spanning a lateral length of the first filter container bottom 216 from its front 130 to its back. As will be shown hereafter, the first and second tracks 221, 222 may be structured as female stabilizers operable to conform geometrically and surround a male ridge on the top of the second filter container 102.

Figure 3A:
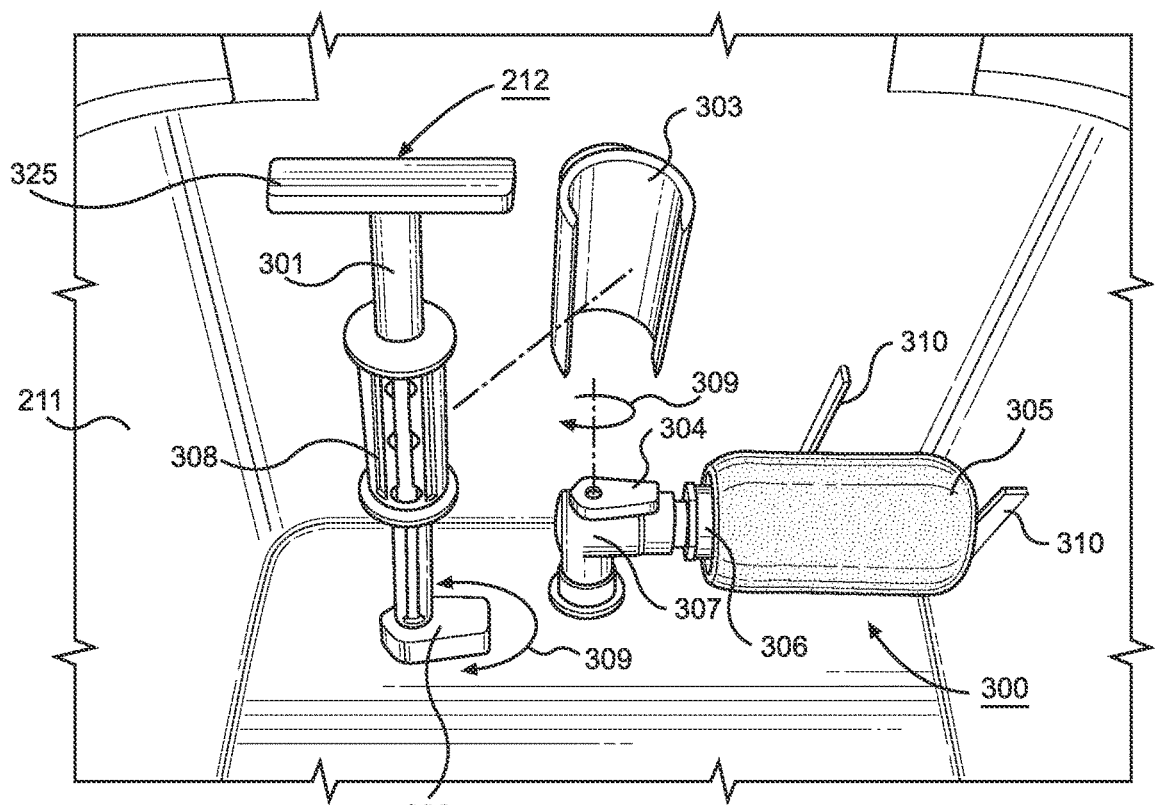
FIG. 3A is an interior view of the first filter container illustrated in FIG. 2A.

FIG. 3A illustrates componentry within the first filter container 101 interior 211. As shown, there may be a lever assembly 212 including a lever 301 with a medial portion that is structured to removably fit into a lever mount 303. The lever mount 303 may be a semi-cylindrical member mounted to a wall of the first filter container 101 operable to receive the lever assembly 212 therein. At one end of the lever assembly 212 may be a lever handle 325 and at an opposing end may be a valve cover 302. The valve cover 302 may be structured to fit overtop a valve 304 on transfer tubing 311 on a first filter assembly 300. The lever assembly 212 with valve cover 302 may be structured to convert the valve 304 into a user-friendly handle operable to turn passive filtering on and off through the first filter assembly 300 within the first filter container 101.

The first filter assembly 300 may be positioned within a bottom quadrant of the first filter container 101 and may include an L-shaped water guide 307 operable to guide water entering the first filter assembly 300 down through the first filter container bottom 216. A foam filter, or more specifically a foam filter sleeve 305 may envelope a filter water guide 306, which may be horizontal tubing running parallel with the first filter container bottom 216 and may also include a portion of the L-shaped water guide 307. Atop a horizontal portion of the L-shaped water guide 307 may be the valve 304. The valve 304 may be the operable means by which the first filter container passive filtering may be turned on and off. As shown, the valve 304 may have a valve motion 309 and rotate to either align with the horizontal portion of the L-shaped water guide 307 or may rotate to be perpendicular thereto. Likewise, the lever assembly 212 and valve cover 302 may rotate along the same valve motion 309 and may facilitate a user's ability to rotate the valve 304.

However, the first filter assembly 300 may be stabilized in place parallel to a filter container wall with the assistance of filter stabilizing ridges 310 within the interior. In particular, one stabilizing ridge 310 may protrude from an end wall of the interior 211 and another stabilizing ridge 310 may protrude from an adjacent side wall of the interior 211. In combination, the stabilizing ridges 310 may assist with keeping the first filter assembly 300 wedged between the two stabilizing ridges 310 and parallel with a side wall of the interior 211.

Figure 3B:
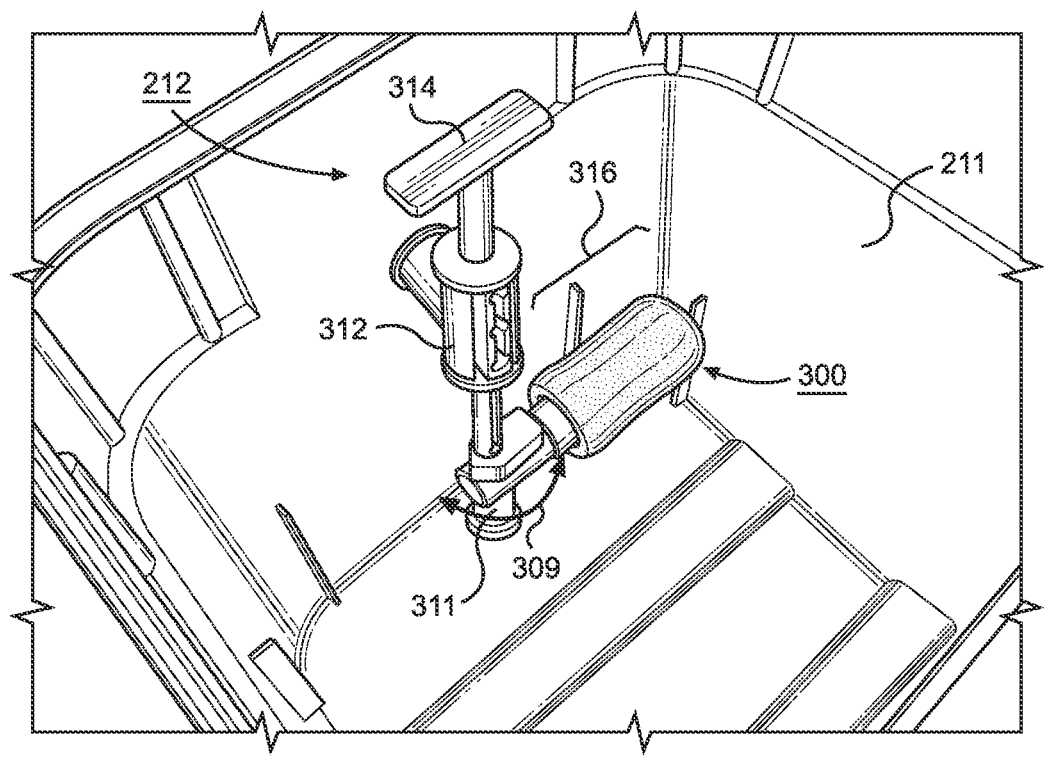
FIG. 3B is a top perspective interior view of the first filter container illustrated in FIG. 2A.
Figure 3C:
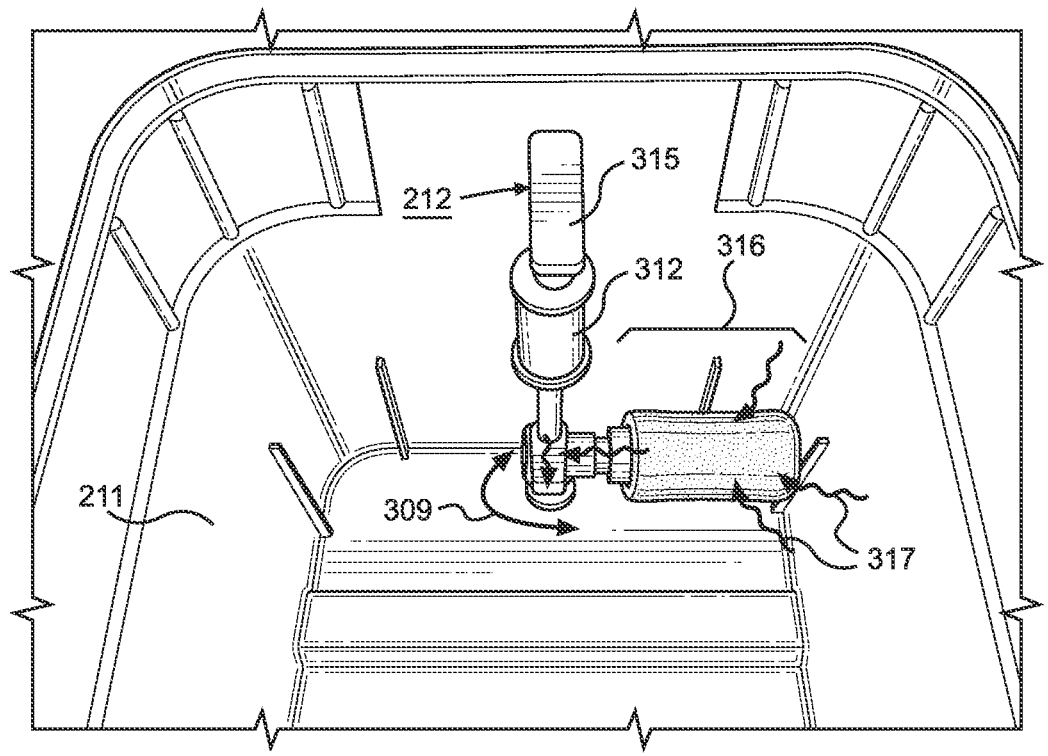
FIG. 3C is a top perspective interior view of the first filter container illustrated in FIG. 2A.

FIGS. 3B and 3C illustrate the functional positioning of the lever assembly 212 as it relates to the on and off positions of the first filter assembly 300 and the relative waterflow 317 therethrough.

FIG. 3B shows the lever assembly assembled 312 into the lever mount 303 and the lever handle 325, valve cover 302 and valve 304 parallel with a side wall of the interior 211. Also shown is the transfer tubing 311 that may assist with transporting filtered fluid, namely waterflow 317 from the first filter container 101 to the second filter container 102. When the valve 304 is aligned with the first filter assembly 300 as shown, this may be considered the off position 314 and water may not flow through the first filter assembly 300 or the transfer tubing 311 as a result.

FIG. 3C illustrates the lever assembly assembled 312 into the lever mount 303 and the lever handle 325, valve cover 302 and valve 304 perpendicular with the side wall of the interior 211. This may be considered the on position 315 and waterflow 317 may pass through the first filter assembly 300 and the transfer tubing 311 as a result. Also of relevance is that the filter assembly 300 remains in the same positioning parallel to the side wall 316 irrespective of the lever assembly 212 or valve 304 positioning.

FIGS. 4A and 4B take a closer look at a portion of the first filter assembly 300 and some componentry that it includes. The first filter assembly 300 may include a fluid intake device 401 with a water exit tube 402, a water passthrough 403, a filter ridge 405 and a foam filter sleeve 404 that may slide overtop and envelop the fluid intake device 401 and abut the filter ridge 405. In some embodiments, the foam filter sleeve 404 may be a cylindrical foam filter body with interior chamber enveloping the fluid intake device 401. In other words, the cylindrical body may have a hollow tunnel chamber and it may include openings at either end. In some embodiments, the first foam filter sleeve 404 including the water intake device 401 may be sized between 20-30% of the longitudinal length of the first filter container Referring additionally to FIGS. 3B and 3C, when the lever 301 is in the on position 315, waterflow 317 is unobstructed and gravity may allow fluid to exit the L-shaped water guide 307. As a result, fluid is allowed to permeate the foam filter sleeve 404, flow into the fluid intake device 401 via the water passthrough 403 and out the water exit tube 402. As shown, fluid is directed through the L-shaped water guide 307 and out the transfer tubing 311 to be filtered by the second filter container 102.

FIG. 5 shows the first filter container bottom 216 and the second filter container top 515. It also demonstrates the architecture of how the filter containers 101, 102 may fit together as well as the pathway of the waterflow 317 once it exits the first filter container 101.

As previously mentioned, the first filter container bottom 216 may include a first track 221 and a second track 222 structured as female stabilizers operable to conform geometrically and surround a male stabilizing ridge 501 on the second filter container top 515. This may allow the first filter container 101 to be placed in a first position and a second position. As shown, the stabilizing ridge 501 is aligned with the second track 222 in the first position to assist with securing the bottom perimeter of the first filter container 101 on the second filter container top 515 within a perimeter of the second filter container top 515.

However, because the second track 222 is parallel to the first track 221, the first filter container 101 is able to shift 502 to the second position and be secured by the first track 221 aligning with and enveloping the stabilizing ridge 501. This shift 502 may allow for the first filter container 101 to expose componentry on the second filter container top 515 while still resting thereon. Therefore, a single user may shift the first filter container 101 longitudinally along the second filter container top 515 where it may securely remain so that the user may tend to the componentry within the second filter container top 515.

Also shown is the transfer tube nodule 503 extending from the first filter container bottom 216 with a transfer opening 504 at its end. The transfer opening 504 may be sized in diameter to allow waterflow 317 to exit the first filter container 101 at a specifically timed pace. In some embodiments, it may be sized to allow the first filter container to empty its allotted amount of fluid in 30 minutes. However, one skilled in the art will appreciate that the diameter of the transfer opening 504 may be larger or smaller to allow for a quicker or slower pace. Furthermore, the transfer tube nodule 503 may be sized to fit within a concaved portion of a second stage splashguard strainer 505 when the first filter container 101 is aligned and resting on the second filter container top 515. Additionally, it should be noted that the transfer tubing 311 may span from an interior of the first filter container 101 to the transfer tube nodule 503 extending from the first filter container bottom 216.

FIG. 6 illustrates the structure of the splashguard strainer 505. In particular, the splashguard strainer 505 may include an outer disc 601 and a bulbous splashguard body 602. The outer disc 601 may be a flat upper portion of the splashguard strainer 505 structured to lay on the second filter container top 515. The bulbous splashguard body 602 may be a semi-spherical bottom portion of the splashguard strainer 505 with holes therein. The diameter of the semi-spherical splashguard strainer 505 may be dimensioned to fit within a cup and cupholder positioned in the second filter container top 515.

FIG. 7 illustrates a second stage cup filter 702 that fits within a cupholder aperture in the second filter container top 515. The second stage cup filter 702 may include a cup lip 703 structured to lay atop the second filter container top 515 to allow the second stage cup filter 702 to suspend within the internal cavity of the second filter container 102. Furthermore, the second stage cup filter 702 may include drainage holes 704 spaced at measured distances structured to allow for timed filtering and the integration of a fluid purifying composition into passing fluid.

Figure 8:
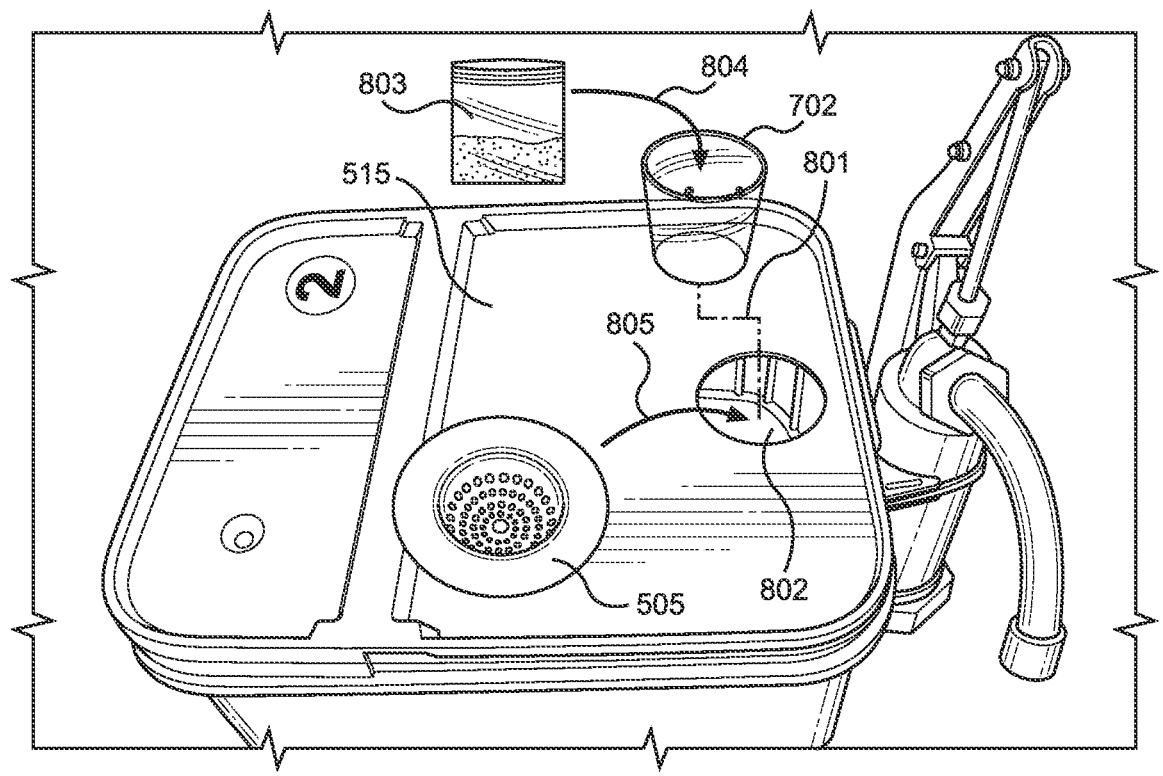
FIG. 8 is a top perspective view of the second filter container with componentry according to an embodiment of the invention.

FIG. 8 shows how the componentry may fit into the second filter container top 515 and the process by which a user may assemble them. As an initial step, a user may ensure a small amount of water is in the second stage cup filter 702 before placing a purifying compound including a chlorine powder mixture 803 into the second stage cup filter 702, 804. The second stage cup filter 702 should rest inside a cupholder aperture 802 within the second filter container top 515. Next, the second stage splashguard strainer 505 should be placed overtop the second stage cup filter 702 to act as a splashguard against heavily chlorinated backsplash that may occur. The holes in the splashguard strainer 505 allow for water to easily permeate the barrier downward, but the bulbous splashguard body 602 and outer disc 601 block most backsplash that may occur in the opposing direction.

Figure 9:
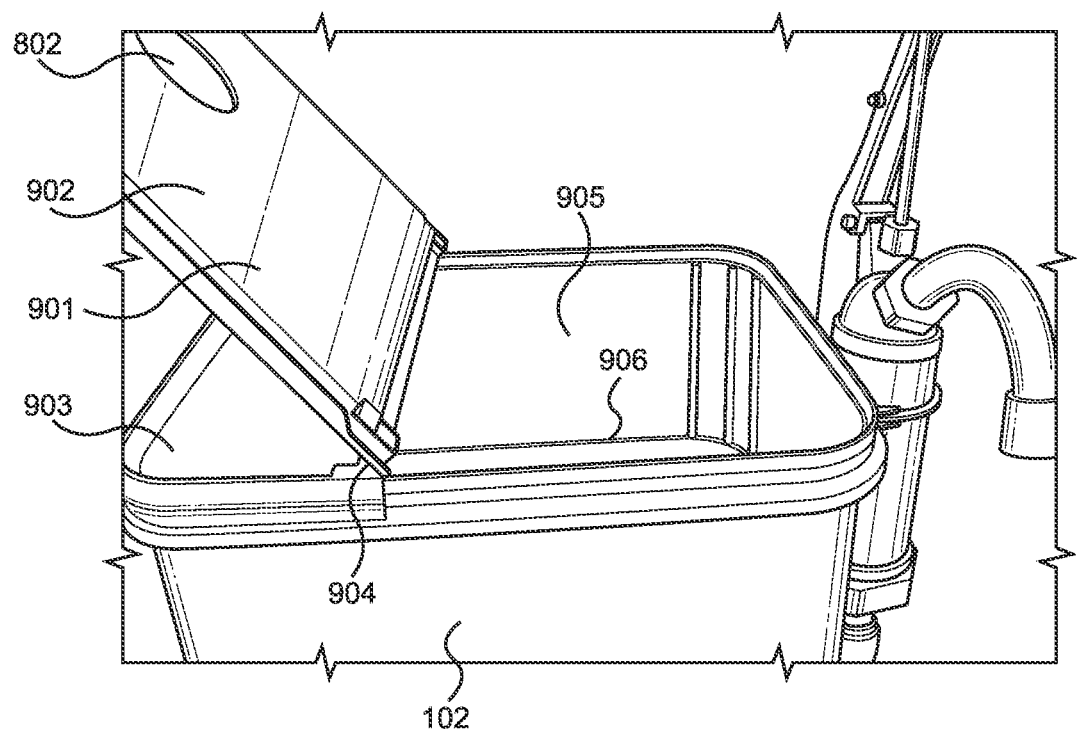
FIG. 9 is a side perspective view of the second filter container with opened lid according to an embodiment of the invention.

FIG. 9 illustrates some of the architecture of the second filter container 102. The second filter container 102 may include a pivoting lid 901 that may rotate along a pivot line 904. The pivot line 904 may bifurcate the pivoting lid 901 into a larger section 902 and a smaller section 903. In some embodiments, the larger section 902 may include the cupholder aperture 802. As shown, the pivoting lid 901 is in an open position whereby the larger section 902 is unattached and rotated along the pivot line 904 exposing an interior 905 of the second filter container 102. Also shown is a second container interior ridge 906 that may act as a shelved platform structured to fit the first filter container 101 thereon. Therefore, when the pivoting lid is fully removed, the first filter container 101 may fit inside the second filter container 102 and sit on the second container interior ridge 906. This may facilitate a compact means for packaging and shipping the system 100.

Figure 10A:
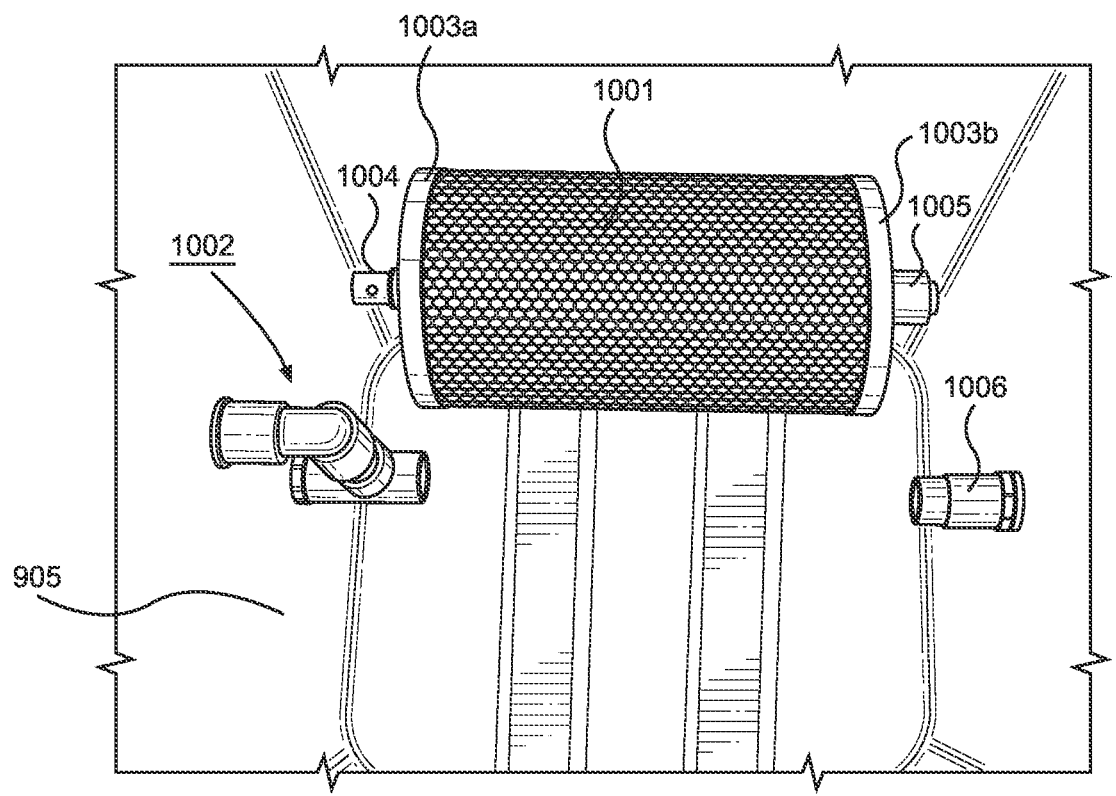
FIG. 10A is a top perspective interior view of the second filter container illustrated in FIG. 9 according to an embodiment of the invention.
Figure 10B:
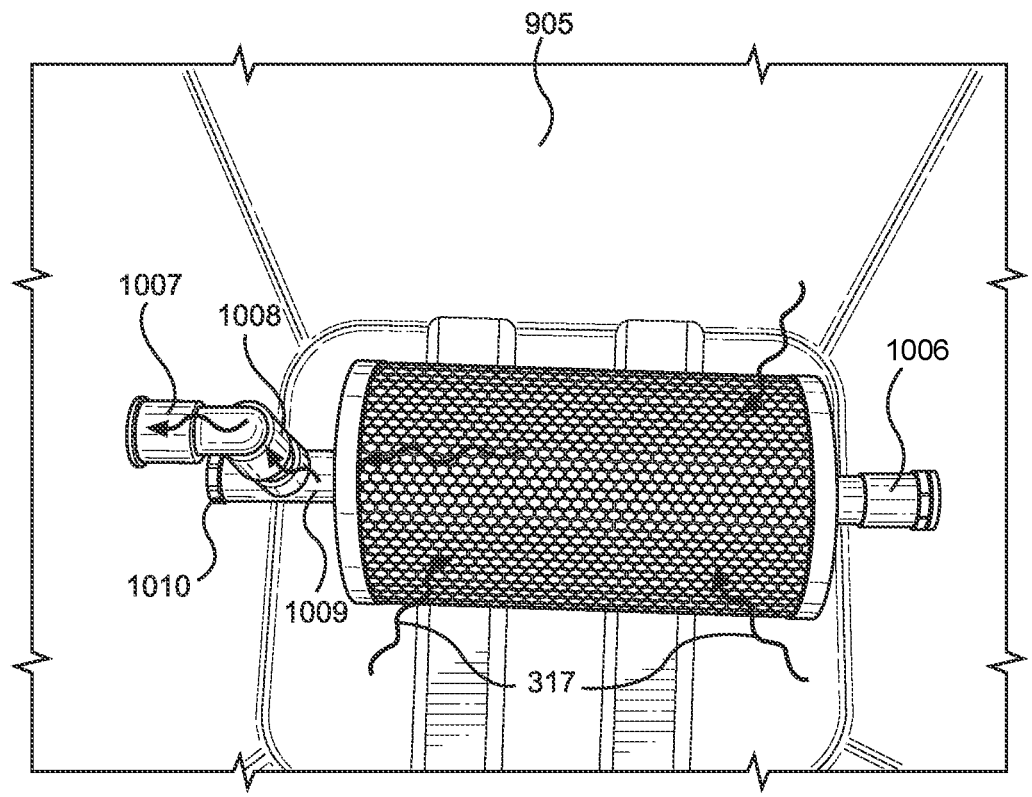
FIG. 10B is a top perspective interior view of the second filter container illustrated in FIG. 9 according to an embodiment of the invention.

FIGS. 10A and 10B are a look at the second filter container interior 905 showing the componentry therein. In particular, there may be a second filter assembly 1000 including a main filter 1001 with first and second main filter endcaps 1003a, 1003b including a filter spout 1004 at one end and a male stabilizer 1005 at an opposing end. The main filter 1001 may be suspended in place proximate the bottom of the second filter container 102. This may be done via exit tubing 1002 removably engaging the filter spout 1004 at the first endcap 1003a and a female stabilizer 1006 engaging the male stabilizer 1005 at the second endcap 1003b. FIG. 10A shows an unengaged main filter 1001 demonstrating how it may engage with the exit tubing 1002 and female stabilizer 1006.

The exit tubing 1002 and female stabilizer 1006 may be fixedly attached to the second filter container 102 at opposing side walls allowing the main filter 1001 to run the longitudinal length of the second filter container 102. In some embodiments, the main filter 1001 may be 80-90% of the longitudinal length of the second filter container 102.

FIG. 10B illustrates a main filter 1001 that has been engaged and suspended within the second filter container 102. It also demonstrates the waterflow 317 within the second filter container 102 as it flows through the main filter 1001. As shown, waterflow 317 may enter the main filter 1001 from all directions. The waterflow 317 may then be channeled through the main filter 1001 out a lower exit tube 1009, up a vertical exit tube 1008, and out the second filter container 102 via an upper exit tube 1007. This happens because the pump 106 is structured to draw second stage filtered fluid from the second container 120 through the exit tubing 1002 and expel the second stage filtered fluid out the pump spout 115. FIGS. 10A and 10B also demonstrate that the exit tubing 1002 is structured to descend into a lower portion of the second filter container 102 and is operable to secure the main filter 1001 within a lower quadrant of the second filter container 102.

Figure 11A:
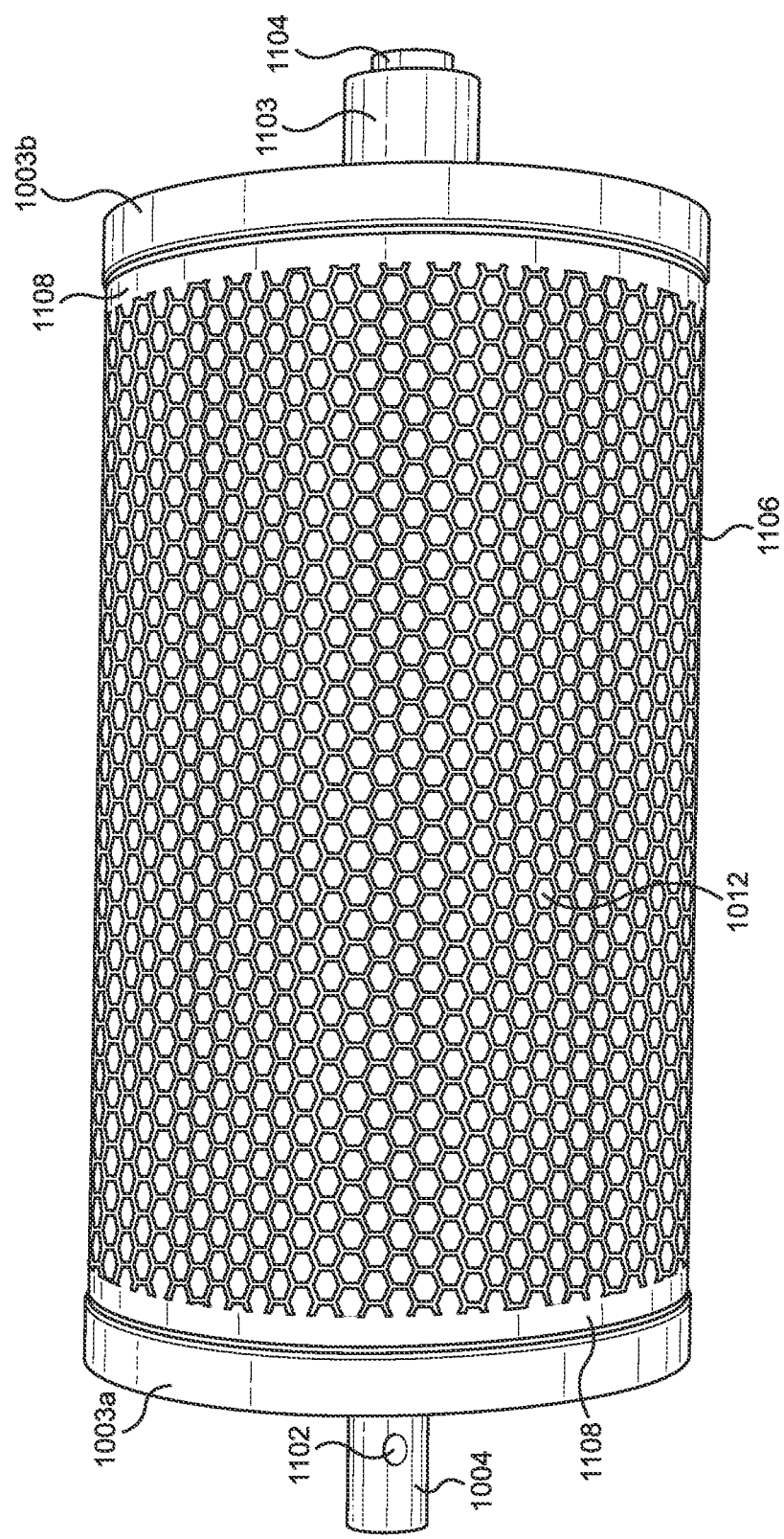
FIG. 11A is a side perspective view of componentry found in the second filter container according to an embodiment of the invention.
Figure 11C:
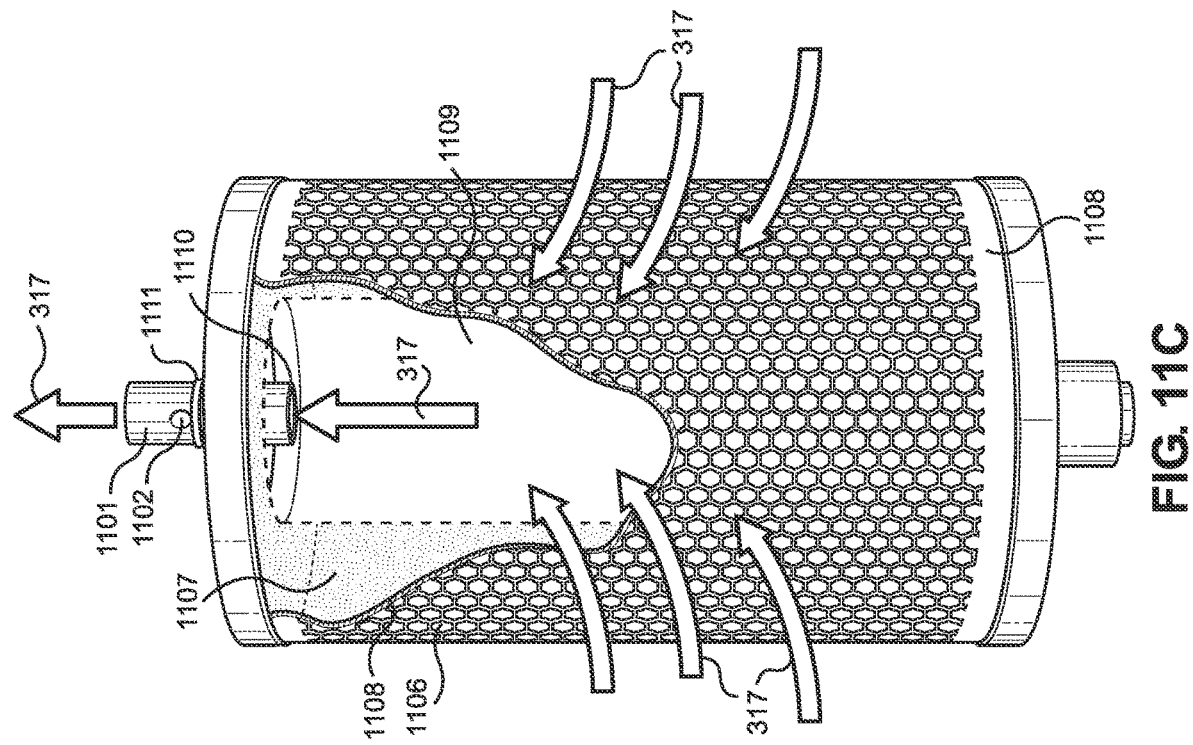
FIG. 11C is a dissected view of componentry found in the second filter container according to an embodiment of the invention.
Figure 11B:
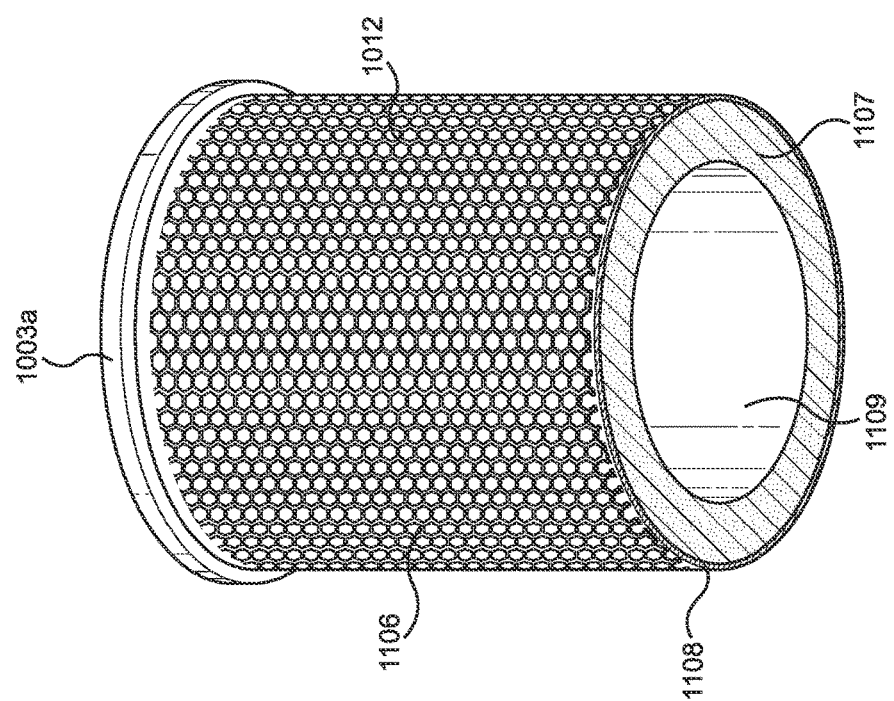
FIG. 11B is a bottom cross-sectional view of componentry found in the second filter container according to an embodiment of the invention.

FIGS. 11A-11C take a closer look at a main filter 1001. In particular, FIG. 11A shows the body 1012 of the main filter is positioned between the two endcaps 1003a, 1003b. The filter spout 1004 may include a spout opening 1102 at one of the main filter endcaps 1003a. The spout opening 1102 may be on the side of the filter spout 1004, the end of the filter spout 1004, or both. The filter spout 1004 may allow for the pump 106 to draw water out and through the main filter 1001 by suctioning air and water therethrough. In other words, the filter spout 1004 and spout opening 1102 may be structured to fit inside the exit tubing 1002 and be operable to draw fluid through the second filter assembly 1000 through a first end.

The opposing endcap 1003b may include a stabilizer base 113 with a stabilizer insert 1104 that may fit within the female stabilizer 1006 in order to removably secure that end of the main filter 1001 to the second container interior 905.

Referring additionally to FIG. 11B, the body 1012 of the main filter 1001 may include a carbon pre-filter wrap 1108 that may envelop a carbon body filter 1107. The carbon pre-filter wrap 1108 may be a thin pre-filter that surrounds the much thicker carbon body filter 1107 underneath. In some embodiments, the carbon pre-filter wrap 1108 may be between two (2) and twenty-five (25) millimeters thick and the carbon body filter 1107 may be between fifty (50) and one hundred (100) millimeters thick. However, one skilled in the art will appreciate that these measurements may be larger or smaller depending on need, preference, and circumstance.

Additionally, the pre-filter wrap 1108 may be secured to the body 1012 of the main filter 1001 by a mesh netting 1106 on its exterior. Furthermore, the carbon body filter 1107 may be a cylindrical filter enveloping a filter chamber 1109. Meaning, the interior of the carbon body filter 1107 may be a hollow tunnel allowing fluid to be filtered as it enters the chamber 1109 and then channeled toward its destination via the tunnel.

FIG. 11C takes a closer look at the structure of the main filter 1001 as well as the path of the relative waterflow 317 when actuated by the pump 106. As shown, waterflow 317 may enter the body 1012 of the main filter 1001 from any angle. The waterflow 317 may pass through the mesh netting 1106, then permeate the carbon pre-filter wrap 1108, then through the carbon body filter 1107 into the filter chamber. The waterflow 317 may then travel through the filter spout 1101 by entering the fluid entry aperture and may then exit through the filter spout 1101. As shown, in some embodiments the filter spout 1101 may extend through the endcap 1003a and may be sealed at the exterior of the main filter endcap 1003a by means of one or more gaskets 1111.

Figure 12:
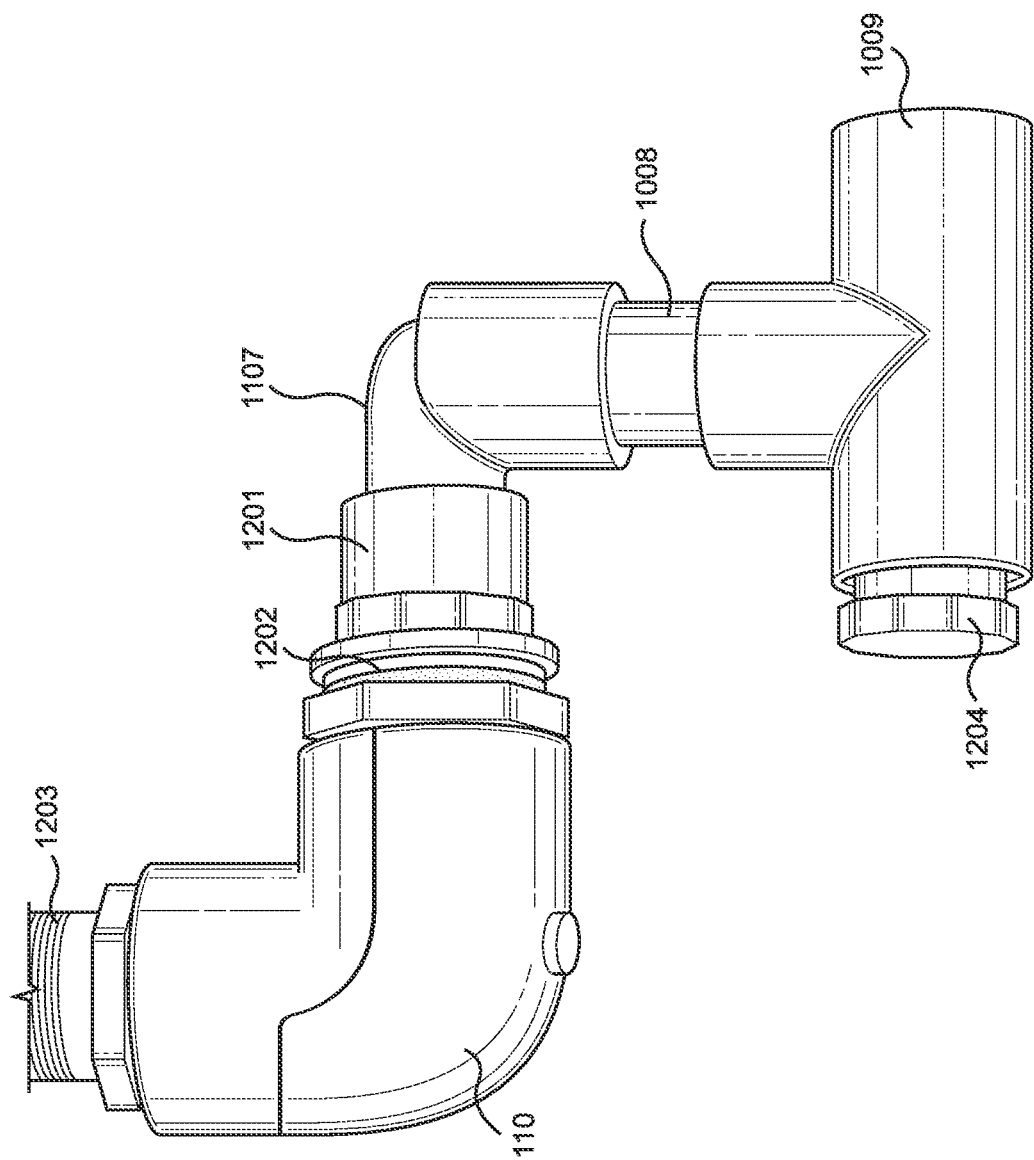
FIG. 12 is a side perspective view of componentry found in the second filter container according to an embodiment of the invention.

FIG. 12 takes a closer look at the exit tubing 1002 that both secures the main filter 1001 in place as well as provides a guided pathway for the waterflow 317 to exit the second filter container 102. As shown, the exterior elbow 110 may connect to the pump threading 1203 in order to secure the pump 106 thereto. While the exterior elbow 110 may be secured to the outside of the second filter container 102, the upper exit tube 1007 may secure to the exterior elbow 110 from the interior of the second filter container 102. Therefore, a side wall of the second filter container 102 may divide the exterior elbow 110 and the upper exit tube 1007. A gasket 1202 may make a water seal with the aperture within the side wall that that hosts the upper exit tube 1007 therethrough.

In some embodiments, the upper exit tube 1007 may be a smaller diameter than the exterior elbow 110. Hence, in order for the upper exit tube 1007 to securely connect with the exterior elbow 110, a step-down insert may be used to make up the diameter difference. A vertical exit tube 1008 may connect perpendicularly to the upper exit tube in order to provide a means for the main filter to be suspended within a lower portion of the second filter container 102. The lower exit tube 1009 may connect perpendicularly with the vertical exit tube in order to provide a horizontal means for connecting to the main filter 1001. On the other side of the lower exit tube 1009 may be an exit tubing stabilizer 1204 structured to fit against the interior wall of the second filter container 102. In some embodiments, the exit tubing stabilizer may be adjustable to extend further out to close the distance between the exit tubing 1002 lower portion and the interior wall. This may allow for a more secure fit for the main filter 1001 within the first filter container 102.

Figure 13:
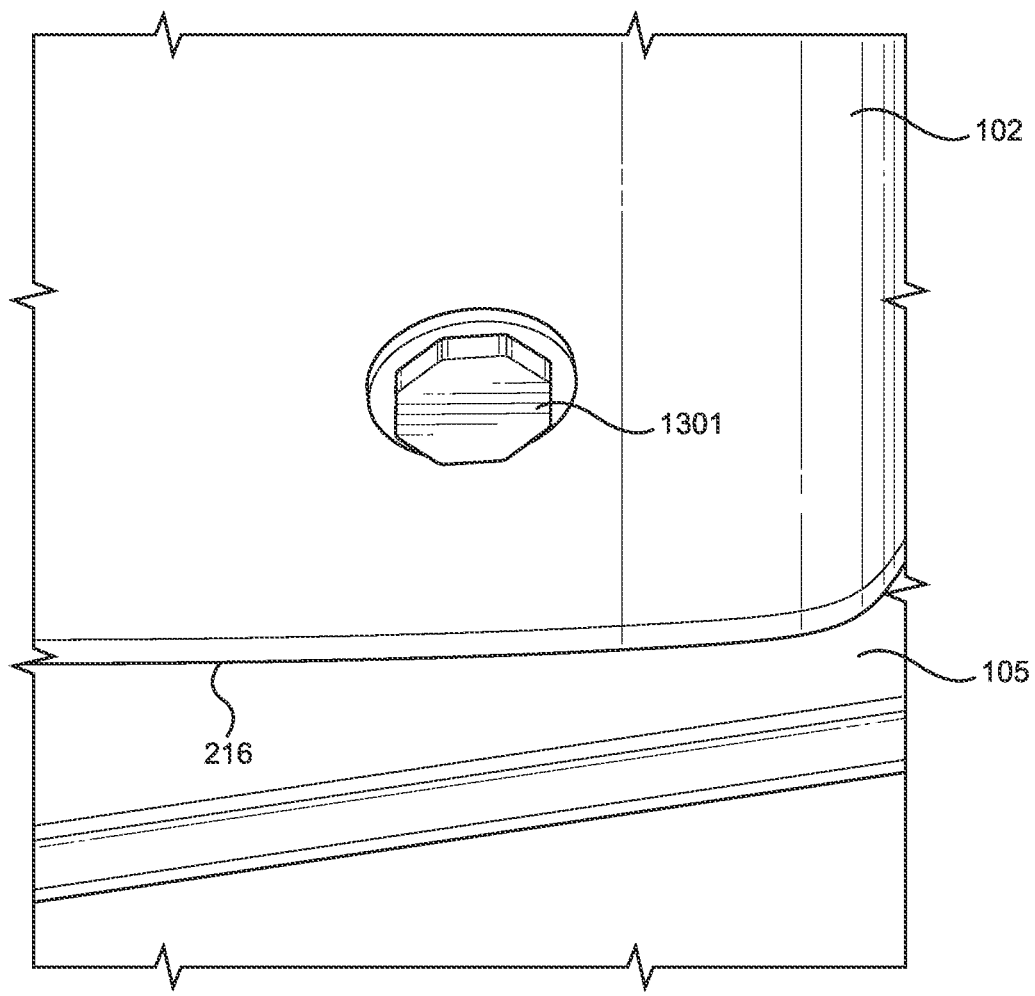
FIG. 13 is a side perspective view of componentry found on the second filter container exterior according to an embodiment of the invention.

FIG. 13 illustrates an exterior side of the second filter container 102. As shown, there may be an exterior filter stabilizer 1301 that fits through the side wall and forms the female stabilizer 1006 on the interior. This exterior filter stabilizer 1301 may assist with providing added leverage to securely suspend the main filter 1001 within the second filter container 102.

Figure 14A:
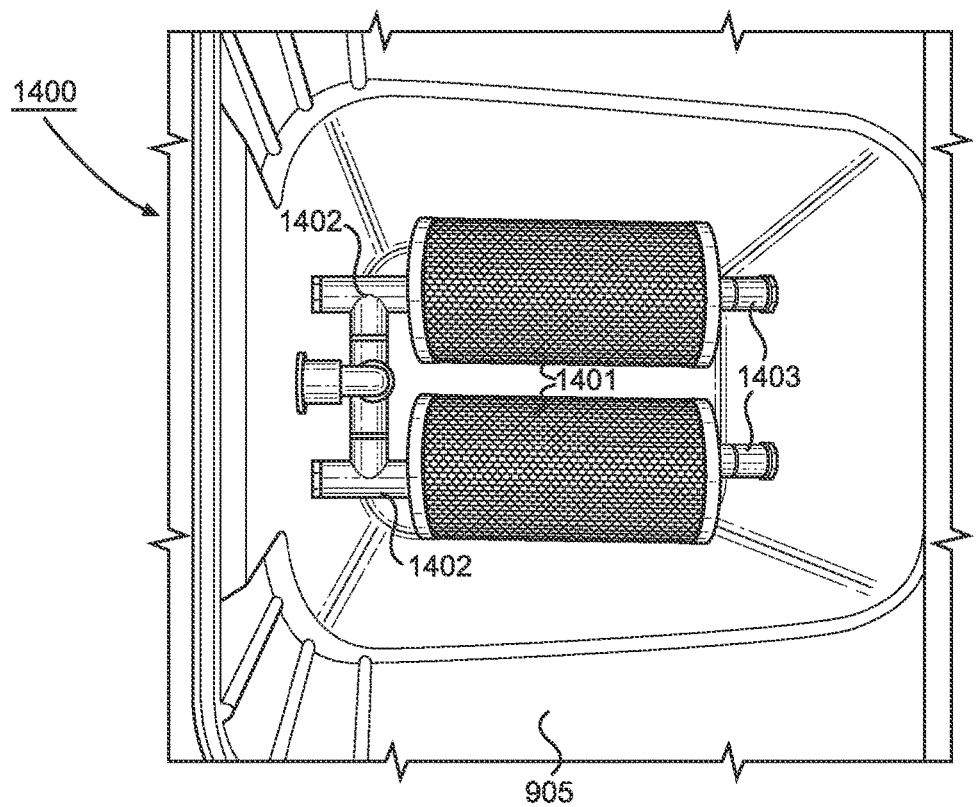
FIG. 14A is a top perspective interior view of the second filter container according to another embodiment of the invention.

FIG. 14A shows a dual filter embodiment 1400 of the system 100. As shown, this embodiment may be the same as the first, but may include dual exit tubing 1402 and dual main filters 1401 secured with dual stabilizers 1403 within the second container interior 905. The dual main filters 1401 themselves may be the same or similar structurally as the single main filter embodiment 100. In other words, the dual filters 1401 may include endcaps 1003a, 1003b, carbon pre-filter wraps 1108, mesh netting 1106, and carbon body filters 1107.

Figure 14B:
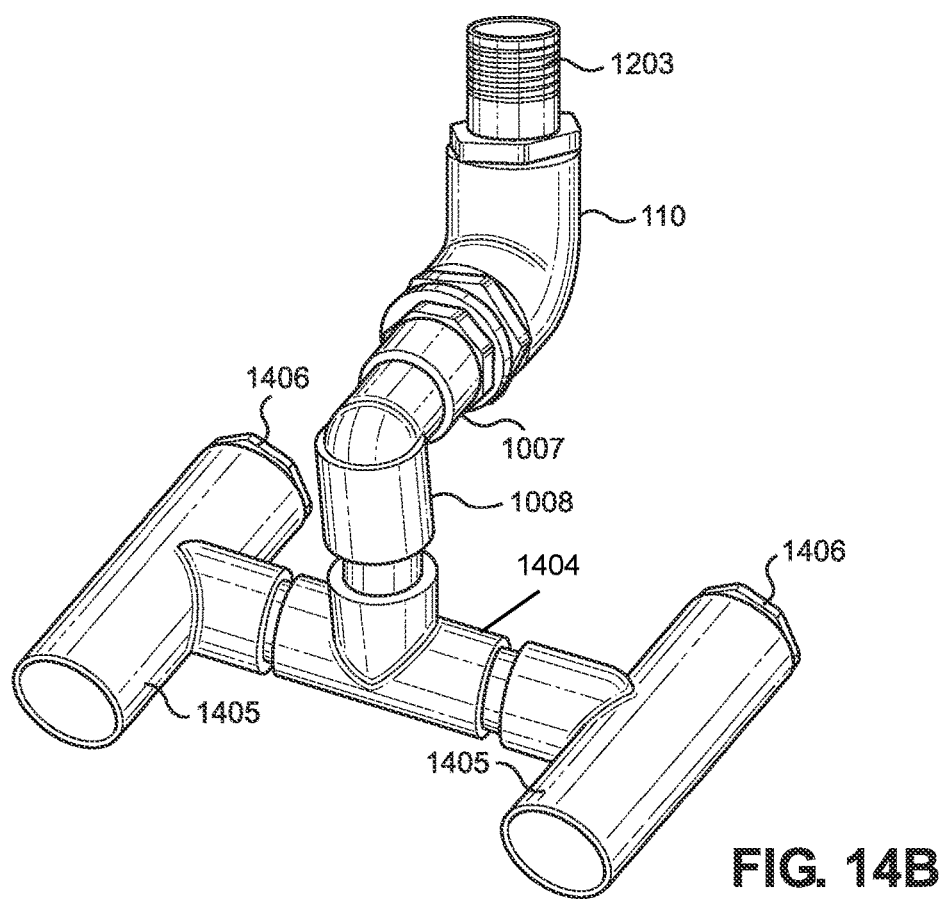
FIG. 14B is a perspective view of componentry found in the second filter container according to the embodiment of the invention illustrated in FIG. 14A.

FIG. 14B illustrates the exit tubing 1002 that has been modified for the dual filter embodiment 1400. Like the single main filter embodiment 1000, this embodiment may include the pump threading 1203 attached to the exterior elbow 110 with an upper exit tube 1007 and a vertical exit tube 1008 designed to descend the dual main filters 1401 into a lower quadrant of the second filter container 102. However, this embodiment may include an exit splitter 1404 designed to bifurcate the lower exit tubing to accommodate both main filters 1401. As shown, the exit splitter 1404 may be an upside-down T-joint whereby the vertical exit tube 1008 connects at the reversed base and additional T-joints form a pair of dual exterior filter stabilizers 1406 and dual lower exit tubing 1405. As shown, the dual exterior filter stabilizers 1406 may form opposing ends of the dual lower exit tubing 1405. The dual lower exit tubing 1405 may be the means by which the waterflow 317 travels from the dual main filters 1401, upwards through the exit tubing 1002 and ultimately out the pump spout 115 when actuated by the pump 106. In some embodiments, the dual filter embodiment 1400 may deliver three times the amount of filtered water with 95% purification compared against a system utilizing a single main filter 1001.

Figure 15:
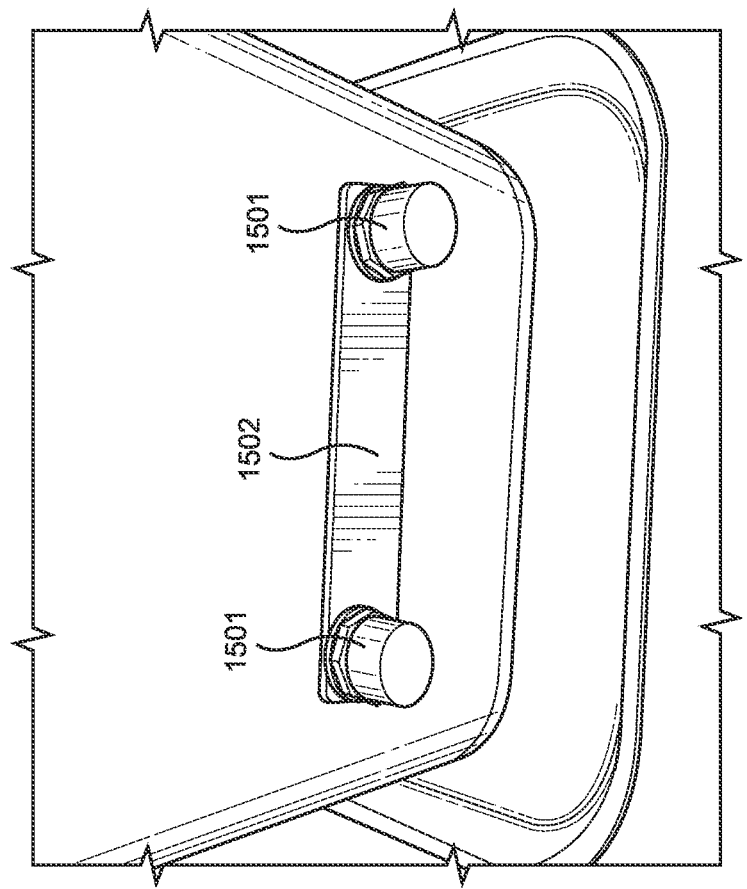
FIG. 15 is a perspective view of componentry found on the second filter container exterior according to the embodiment of the invention illustrated in FIG. 14A.

FIG. 15 illustrates an exterior side of the second filter container 102 with the dual filter embodiment 1400. As shown, there may be dual exterior filter stabilizers 1501 that fit through the side wall to form the female stabilizers on the second container interior 905. These exterior filter stabilizers 1501 may assist with providing added leverage to securely suspend the main filters 1401 within the second filter container 102. Further included may be a stabilizer brace 1502 that may assist with maintaining the shape and integrity of the second filter container 102 as well as provide added leverage to securely suspend the main filters 1401 within the second filter container 102.

Figure 16:
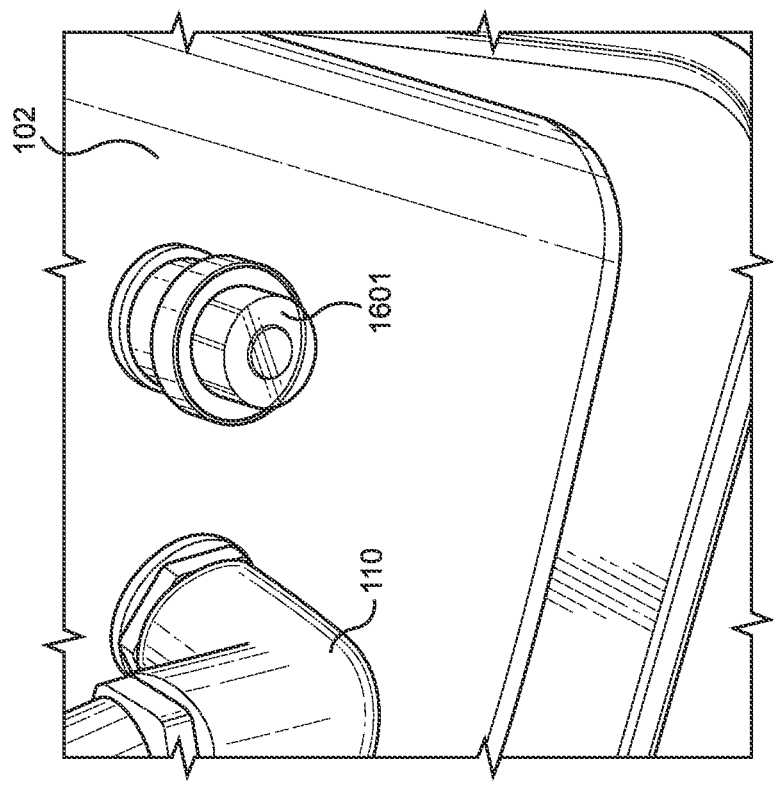
FIG. 16 is a perspective view of componentry found in the second filter container according to an embodiment of the invention

FIG. 16 shows an embodiment whereby the system 100 may include a viewing window 1601. This viewing window 1601 may be structured to allow a user to see through a side of a first or second filter container 101, 102 to view the level of water within the respective container. As shown, the viewing window 1601 may be located on the second filter container 102 on the pump side 103 proximate the exterior elbow 110. This positioning may allow for the most efficient means for a user to view the interior water level while pumping. Also used to facilitate viewing accurate water levels may be water level ridges within the interior of the first and second filter containers 101, 102 operable to assist with gauging appropriate water levels within a respective container.

Figure 17:
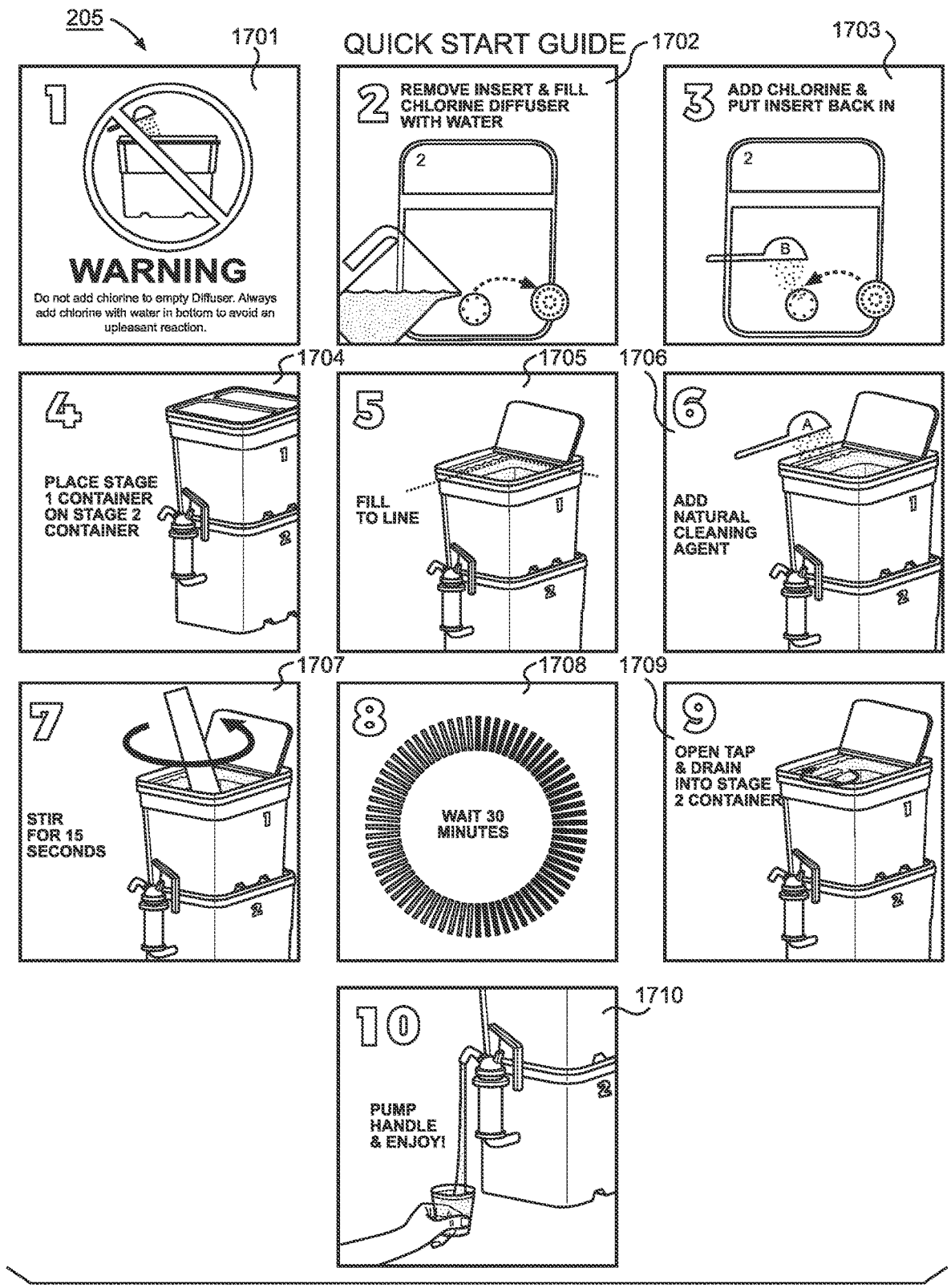
FIG. 17 is a block diagram of functional features of the fluid filtering system and associated methods according to an embodiment of the invention.

FIG. 17 illustrates the quick start guide 205 that may accompany each system 100 providing an easy instructional and operational overview of the system 100. Therefore, a review of the quick start guide 205 may assist with describing a functional overview of the system 100.

Block 1701 may provide a warning that the system 100 may utilize a purifying compound 803 including a chlorine mixing agent and that the purifying compound 803 should not be added to an empty second stage cup filter 702. It notes that the purifying compound 803 should always be added with water prefilled in the bottom of the second stage cup filter 702 to avoid an unpleasant reaction. Block 1702 notes that the first step may be to remove the second stage splashguard strainer 505 and fill the second stage cup filter 702 with water. In some embodiments, the water used here may be water that has already undergone filtering through the first filter container 101. In other embodiments, it may be water that has passed through the entire system 100 and been filtered through both the first and second containers 101, 102 on a previous iteration.

Next, as block 1703 notes, the purifying compound 803 may be added to the second stage cup filter 702 and the second stage splashguard strainer 505 may be put back into place. Block 1704 notes that the first filter container 101 should then be placed on top of the second filter container 102 and water to be purified should be filled to a pre-established fill line that has either been marked on the first filter container 101 or structurally formed as a ridge thereon. Next, block 1706 indicates that a natural cleaning agent may be added to the first filter container 101, which may be stirred for 15 seconds 1707 into the water filled first filter container 101. It is suggested that a waiting period, in some embodiments 30 minutes, should be allotted before moving to the next step. This may allow for the natural cleaning agent to be integrated into the water. Next, block 1709 indicates that the lever 301 should be turned to the on position 315 to allow passive water filtration through the first filter assembly 300 within the first filter container 101 and then allow for that filtered waterflow 317 to drain into the second filter container 102. Block 1710 indicates that a user may then actuate the pump 106 to filter water through the second filter container 102 and out the pump spout 115 for use.

That which is claimed is:

1. A two-stage filtering system comprising a first filter container comprising a top; and a bottom, a first filter assembly comprising a foam filter sleeve enveloping a fluid intake device, a valve connected to the first filter assembly, and transfer tubing, a second filter container comprising a top with cupholder aperture, and a bottom, a pump connected to a pump spout, a second stage splashguard strainer, a second stage cup filter, a second filter assembly comprising at least one main filter comprising at least one cylindrical carbon body filter enveloping a filter chamber positioned between a first endcap and a second endcap, at least one cylindrical female stabilizer extending from an interior sidewall of the second filter container configured to engage a male nodule on the second endcap and stabilize the at least one main filter; and exit tubing; wherein the first filter container is configured to stack on top of the second filter container; wherein the transfer tubing is configured to transfer first stage filtered fluid to the second filter container; and wherein the pump is configured to draw second stage filtered fluid from the second filter container through the exit tubing and expel the second stage filtered fluid out the pump spout.

2. The two-stage filtering system of claim 1 wherein the pump is nonelectric; and wherein the first filter container is configured to purify fluid using a nonelectric passive first filter assembly and the second filter container is configured to draw the purified fluid through the at least one main filter via the nonelectric pump.

3. The two-stage filtering system of claim 1 wherein the lever assembly comprises a handle operable to rotate the lever assembly and rotate the valve simultaneously.

4. The two-stage filtering system of claim 1 wherein the second stage cup filter comprises drainage holes spaced at measured distances configured to allow for timed filtering and the integration of a fluid purifying compound into passing fluid.

5. The two-stage filtering system of claim 1 wherein the first endcap includes a filter spout and spout opening configured to fit inside the exit tubing operable to draw fluid through the second filter assembly and out a first end.

6. The two-stage filtering system of claim 1 wherein the exit tubing is configured to descend into a lower portion of the second filter container and is operable to secure the at least one main filter within a lower quadrant of the second filter container.

7. The two-stage filtering system of claim 1 wherein the second stage cup filter is configured to fit within the cupholder aperture in the second container top and the second stage splashguard strainer is configured to fit overtop the second stage cup filter.

8. The two-stage filtering system of claim 7 wherein the transfer tubing extends from an interior of the first filter container to a nodule extending from the first filter container bottom; and wherein the nodule is configured to fit within a concave portion of the second stage splashguard strainer.

9. The two-staged filtering system of claim 8 wherein the nodule comprises a transfer opening sized and configured to allow fluid to exit the first filter container at a specifically timed pace.

10. A two-stage filtering system comprising
a first filter container comprising
a top and a bottom,
a first filter assembly comprising
a first cylindrical foam filter body with interior chamber enveloping a fluid intake device,
a lever assembly comprising an extended lever and valve connected to the first filter assembly, and
transfer tubing extending through the first filter container bottom and terminating in a transfer tube nodule on the first filter container bottom exterior,
a second filter container comprising
a top, and a bottom,
a pump connected to a pump spout,
a second stage splashguard strainer,
a second stage cup filter,
a second filter assembly comprising
at least one main filter comprising at least one cylindrical carbon body filter enveloping a fluid chamber positioned between a first endcap and a second endcap,
at least one cylindrical female stabilizer extending from an interior sidewall of the second filter container configured to engage a male nodule on the second endcap and stabilize the at least one main filter; and exit tubing;
wherein the first filter container is configured to stack on top of the second filter container;
wherein the lever assembly is configured to turn passive filtration on and off within the first filter container;
wherein the transfer tubing is configured to transfer first stage filtered fluid to the second filter container;
wherein the at least one main filter is secured within the second filter container via exit tubing connected to the first endcap at one end and a side stabilizer connected to the second end cap at an opposing end;
wherein the transfer tube nodule includes an opening sized and configured to provide time delivered purified fluid from the first filter container through the second stage splashguard strainer and into the second stage cup filter; and
wherein the pump is configured to draw purified fluid from the second container through the exit tubing and expel the fluid out the pump spout.

11. The two-stage filtering system of claim 10 wherein the first cylindrical foam filter and the at least one main filter are positioned within a bottom quadrant of the first filter container and second filter container respectively.

12. The two-stage filtering system of claim 10 wherein the lever assembly removably engages a side mount fixedly attached to a wall of the first filter container.

13. The two-stage filtering system of claim 10 wherein the first filter container includes a first track and a second track on its bottom configured to engage a stabilizing ridge on the second filter container top to position the first filter container in a first position and a second position.

14. The two-stage filtering system of claim 10 wherein the first cylindrical foam filter includes a foam filter sleeve configured to be between 20-30% of the longitudinal length of the first filter container; and wherein the at least one main filter is configured to be between 80-90% of the longitudinal length of the second filter container.

15. The two-stage filtering system of claim 10 wherein the system further comprises at least one of container side handles, container pivoting lids, container stage indicators, a usage chart, a quick start guide, a filter replacement chart, and filter container water level ridges operable to assist with gauging appropriate water level within a respective filter container.

16. The two-stage filtering system of claim 10 wherein at least one of the first filter container and the second filter container include a viewing window configured to allow a user to see through a side of a respective container to view the level of water within the respective container.

17. A two-stage filtering system comprising
a first filter container comprising
a top, and a bottom,
a first filter assembly comprising
a cylindrical foam filter sleeve with interior chamber enveloping a fluid intake device,
a lever assembly and valve connected to the first filter assembly, and transfer tubing,
a second filter container comprising
  a top and a bottom,
  a pump connected to a pump spout,
  a second stage splashguard strainer,
  a second stage cup filter with drainage holes,
  a side viewing window,
  a second filter assembly comprising
    at least two main filters comprising cylindrical carbon body filters enveloping fluid chambers positioned between first endcaps and second endcaps, and
  exit tubing comprising
    an exterior elbow connected to the pump at the second container exterior,
    an upper exit tube on the second container interior that connects to the exterior elbow,
    an interior upper exit tube connected to a vertical exit tube,
    an exit tube splitter configured to connect to dual lower exit tubing;
wherein each main filter is secured at a first end within the second filter container via the lower exit tubing connected to each main filter first endcap;
wherein each main filter is further secured at a second end within the second filter container via side stabilizers connected to respective second endcaps of each main filter;
wherein the exit tubing is configured to descend into a lower portion of the second filter container and is operable to secure each main filter within a lower quadrant of the second filter container;
wherein the first filter container is configured to stack on top of the second filter container;
wherein the lever assembly is configured to turn passive filtration on and off within the first filter container;
wherein the transfer tubing is configured to transfer first stage filtered fluid to the second filter container;
wherein the pump is configured to draw purified fluid from the second filter container through the exit tubing and expel the fluid out the pump spout;
wherein the second filter container comprises dual exterior filter stabilizers configured to connect with the side stabilizers to secure the at least two main filters; and
wherein a stabilizer brace is connected to the dual exterior filter stabilizers to maintain the structural integrity of the second filter container.

18. The two-stage filtering system of claim 17 wherein the second stage cup filter is configured to hold a purifying compound operable to facilitate fluid filtration; and wherein the drainage holes are positioned to facilitate the purifying compound integration into passing fluid.

19. The two-stage filtering system of claim 17 wherein the pump comprises a reversible spout and the second filter container comprises an interior ridge configured to support the first filter container bottom perimeter to facilitate compact packaging of the system.

20. The two-stage filtering system of claim 17 wherein the lever assembly removably engages a side mount fixedly attached to a wall of the first filter container.

* * * * *